Patented Sept. 26, 1950

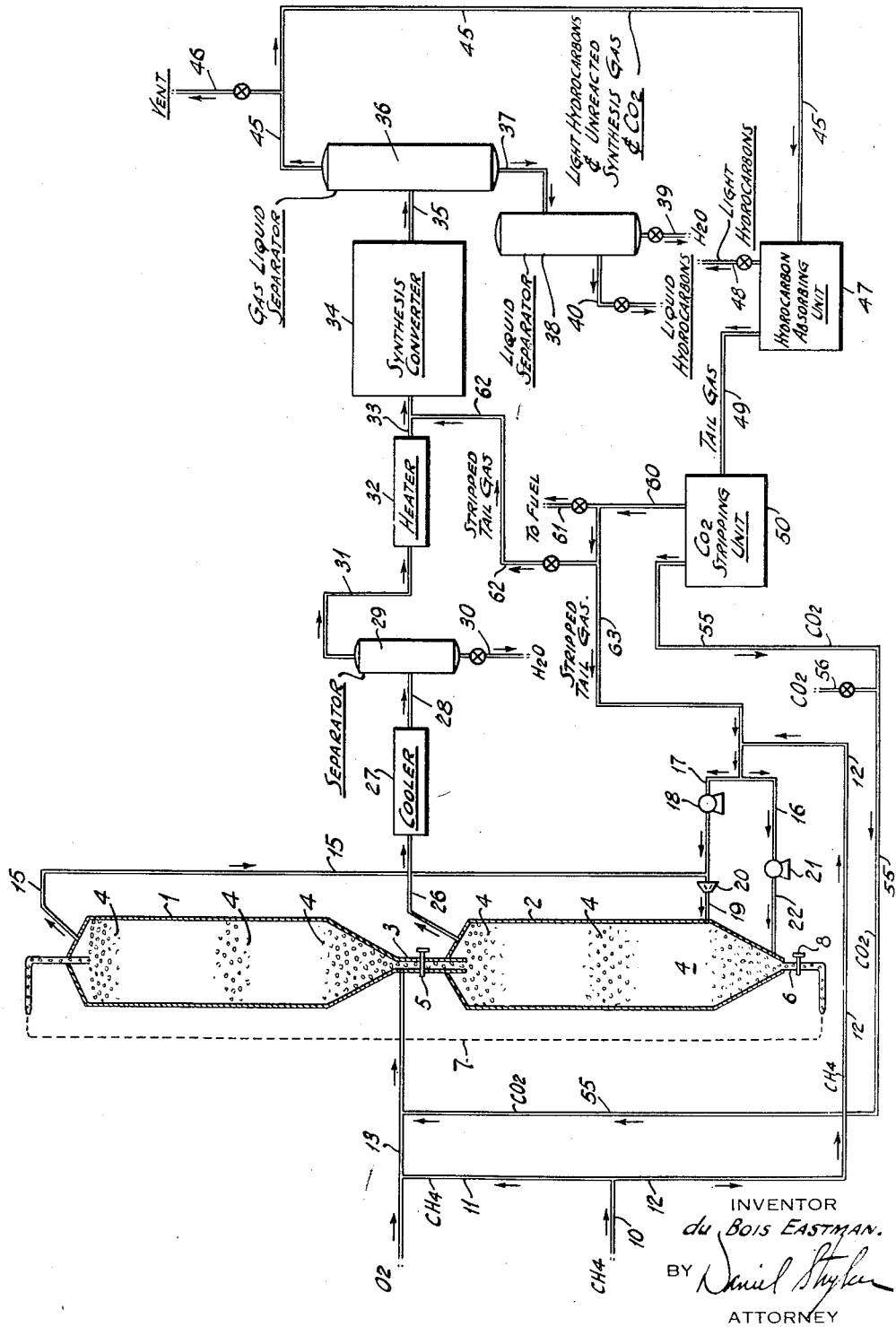

2,523,284

UNITED STATES PATENT OFFICE 2,523,284

METHOD OF MANUFACTURING HYDROGEN AND CARBON MONOXIDE du Bois Eastman, Scarsdale, N. Y., assignor to The Texas Company, New York, N. Y., a corporation of Delaware Application August 17, 1945, Serial No. 611,173

8 Claims. (Cl. 23—212)

This invention relates to a continuous process for preparing from normally gaseous hydrocarbons a mixture of carbon monoxide and hydrogen which may be catalytically converted into a mixture of hydrocarbons, oxygenated hydrocarbons and the like.

The invention comprises a method for preparing a mixture of carbon monoxide and hydrogen in desired proportions by employing two separate reaction zones, one exothermic and the other endothermic. In the endothermic zone heat energy required for the endothermic reaction of gaseous hydrocarbons with a carbon dioxide-steam mixture is supplied by cyclically circulating through the endothermic zone a catalyst-bearing heat carrier which has been separately raised to an elevated temperature by the exothermic oxidation of gaseous hydrocarbons with an oxygen-rich gas. A major portion of the carbon dioxide-steam mixture used in the endothermic reaction is supplied by introducing into the endothermic zone the combustion products of the exothermic oxidation of the gaseous hydrocarbons. In this manner, both the sensible heat of the gases which are produced by the exothermic oxidation of gaseous hydrocarbons with the oxygen-rich gas and the heat of reaction of the exothermic oxidation, absorbed and transported by the continuously circulating catalyst-bearing heat carrier, are utilized to supply heat energy required for the endothermic conversion of gaseous hydrocarbons and a carbon dioxide-steam mixture into carbon monoxide and hydrogen.

In accordance with the invention, the exothermic oxidation of gaseous hydrocarbons occurs in the presence of a solid heat carrier substance which contains a catalyst effective in promoting the endothermic conversion of a mixture of hydrocarbon gas, carbon dioxide and steam into synthesis gas. The catalyst-bearing solid heat carrier moves in a substantially continuous flow from the exothermic oxidation zone wherein it has attained an elevated temperature to the endothermic zone wherein it supplies heat energy used to convert into synthesis gas a mixture of gaseous hydrocarbons and the products of the exothermic oxidation, namely, carbon dioxide and steam. The catalyst-bearing carrier, after giving up its heat content, at least in substantial amount to the endothermic reaction, is withdrawn and continuously returned to the exothermic zone. Therein the heat content of the catalyst-bearing heat carrier is restored before it is again returned to the endothermic zone.

The carbon monoxide and hydrogen resulting from this process are introduced into a synthesis unit wherein they are converted into hydrocarbons or oxygenated hydrocarbons depending upon the catalyst employed and the operating conditions of temperature and pressure used.

The strongly endothermic nature of the reaction between gaseous hydrocarbons and a carbon dioxide-steam mixture of any proportions has presented a difficult problem in the preparation of an inexpensive synthesis gas. The reaction between gaseous hydrocarbons and a mixture of carbon dioxide and steam does not proceed, for all practical purposes, below 1500° F. and a preferred reaction range is 1650 to 1830° F. when a catalyst is employed. The apparatus required to keep the temperature of reaction at such a high level is costly. The preparation of an inexpensive synthesis gas has retarded the development of a low priced synthetic source of gasoline as much as the difficulties entailed in the synthesis proper.

Various non-catalytic thermal methods have been applied to the preparation of synthesis gas. These non-catalytic thermal methods require an extremely high temperature to effect the dissociation of carbon dioxide; moreover, acetylene formation is prevented only by the use of a long retention period. The catalytic thermal procedure of this invention provides a source of inexpensive synthesis gas.

The invention is of particular application as applied to the type of hydrocarbon synthesis process described in the co-pending application, Serial Number 586,004 of Harry V. Rees and Clifford G. Ludeman, filed March 31, 1945, for Manufacture of Hydrocarbons and the like, which has matured into Patent No. 2,486,879.

The method of my invention is advantageously carried out in a reactor which comprises two vessels, one set above the other and connected by a tubular leg through which the catalyst-bearing heat carrier employed in my invention gravitates continuously from the upper to the lower vessel. After the catalytic material has supplied heat energy to the endothermic conversion, it is returned to the upper vessel by means of a mechanical elevator, gas lift or other suitable conveying means.

In the upper vessel, a gaseous hydrocarbon charge is exothermically oxidized with an oxygen-rich gas so that the catalyst-bearing solid heat carrier present therein attains a temperature in excess of 2,000° F., preferably 2,000 to 2,400° F. The products of this combustion, comprising mainly carbon dioxide and steam, and a small amount of nitrogen originally present in the oxygen-rich gas, are discharged from the upper vessel at an elevated temperature, i. e., over 2,000° F., and are directly introduced into the lower vessel.

The catalyst-bearing heat carrier continuously gravitates through the tubular leg connecting the upper vessel with the lower. The height of this connecting leg is of a magnitude sufficient to maintain such a pressure differential between the upper and lower vessel that the gaseous reactants and products present below are prevented, or substantially entirely prevented, from diffusing into the upper vessel. The lower vessel is operated at a higher pressure than the upper for two reasons; one, to facilitate the transfer of the catalyst from the lower to the upper vessel via the elevator system; two, to prevent diffusion of the combustion mixture from the upper to the lower vessel. This pressure differential is obtained through a system of feed injection into the lower vessel which will be described later, and through the magnitude of the leg connecting the lower and upper vessel.

The catalyst-bearing solid heat carrier enters the lower vessel at a temperature in the vicinity of 2,000 to 2,200° F. The heat content of this catalytic material is used to supply energy for the conversion of an additional hydrocarbon charge, introduced into the lower vessel, and the carbon dioxide-steam mixture produced in the exothermic oxidation in the upper vessel. As the solid catalytic material moves downwardly under the force of gravity through the lower vessel, its heat content is dissipated by heat exchange with the endothermic conversion. It may then be further cooled by a procedure described later, and then conveyed from the lower vessel and introduced into the top of the upper vessel.

The overall procedure is cyclic and the movement of the catalytic material is regulated so as to maintain the desired temperatures in the exothermic zone and in the endothermic zone.

The oxygen-rich gas which is used in the exothermic oxidation of gaseous hydrocarbons advantageously contains at least 50% oxygen. If the diluent constitutes more than about 50%, it is necessary to separate nitrogen from the combustion products before they can be introduced into the endothermic conversion zone. Otherwise the synthesis gas prepared in the endothermic zone would contain too large a percentage of nitrogen for it to be directly introduced into the synthesis converter and separation of nitrogen from carbon monoxide and hydrogen poses a difficult problem. Thus, since the nitrogen must be removed from the effluent stream issuing from the exothermic reaction, the advantage, accruing from the use of the sensible heat of the gas produced in the exothermic reaction by directly introducing it into the endothermic zone, is lost. Preferably the oxygen content of the oxidizing gas is above 90%.

The temperatures attainable by oxidizing a hydrocarbon gas such as methane with substantially pure oxygen are inordinately high, i. e., in the range of 4,000° F.; such temperatures are prohibitive from the standpoint of construction materials. In my process, the temperature of this oxidation is maintained within the desired range, i. e., about 2,000° to 2,500° F. by the continuous withdrawal of catalytic heat carrier from the upper exothermic vessel through the connecting leg and continuous addition of cool catalytic heat carrier to the top of the upper vessel. Thus, the problem of construction materials is simplified as refractory material, such as fire-resistant brick, is available which can withstand the temperatures contemplated in my process. Both the upper and lower vessels and the connecting leg and elevator are lined with such material.

A feature of my invention is that any carbonaceous material which is deposited on the surface of the catalytic heat carrier during the endothermic conversion of gaseous hydrocarbons and a carbon dioxide-steam mixture into synthesis gas, is burned off in the exothermic zone. Any carbon deposited on the catalytic material will be exodized into carbon dioxide under the conditions existing in the exothermic zone. Carbon dioxide thus formed is introduced into the endothermic zone, together with the products of the exothermic oxidation of the hydrocarbon gas. Herein it takes part in the conversion of gaseous hydrocarbons into synthesis gas.

The invention is advantageously employed in a process wherein the carbon monoxide and hydrogen resulting from the operation of the invention are subjected to a synthesis reaction using an iron type catalyst. This type of catalyst results in the formations of synthesis products containing carbon dioxide in substantial amounts. In accordance with the present invention, such carbon dioxide, in whole or in part, is recycled to the exothermic zone wherein it serves as a quenching agent for the highly exothermic oxidation taking place therein. Moreover, such carbon dioxide is ultimately converted into valuable products thereby reducing the overall amount of oxygen feed gas required. If synthesis catalysts other than iron are used, such as cobalt or nickel, the smaller quantities of carbon dioxide produced are recycled in similar fashion.

The endothermic reaction between hydrocarbon gas and the carbon dioxide-steam mixture is a combination of two endothermic oxidation reactions. Using methane as representative hydrocarbon gas, these reactions may be shown in this manner:

$$CH_4 + H_2O \rightarrow CO + 3H_2$$
$$CH_4 + CO_2 \rightarrow 2CO + 2H_2$$

By varying the quantities of carbon dioxide and steam introduced into the endothermic zone, the ratio of carbon monoxide to hydrogen formed may be varied within the limits of 1:1 to 1:3. In this invention, the quantities of carbon dioxide and steam which are produced in the exothermic zone and then directly conducted to the endothermic zone are in the ratio of about 1:2. Such a mixture will result in the formation of a 1:2 carbon monoxide-hydrogen mixture in the endothermic zone. Such a ratio is advantageous if a nickel or cobalt catalyst is to be used, but a 1:1 ratio of carbon monoxide to hydrogen is desired if an iron catalyst is employed. The addition of excess carbon dioxide to the system by recycling as mentioned above serves to establish a ratio nearer to 1:1 for the carbon monoxide-hydrogen produced in the endothermic zone.

An advantage of the invention is that a synthesis gas is obtained which is substantially free from nitrogen. A further advantage resides in the continuous method of flow employed therein.

Moreover, the invention provides means for making available to the endothermic zone all the heat energy produced in the exothermic zone.

The invention can be more aptly described and fully understood by reference to the accompanying drawing wherein a diagram of flow for the overall process is illustrated.

Two conical vessels, the upper identified by the numeral 1 and the lower by the numeral 2, are set one above the other and are connected by a tubular leg 3. The vessels are constructed of high-grade steel and lined with a refractory material capable of withstanding elevated temperatures, i. e., in the range of about 2500° F.

In operation, the vessels 1 and 2 are filled with a catalyst-bearing heat carrier identified in the diagram by the numeral 4. The catalyst-bearing heat carrier is preferably nickel-bearing alumina which may be used in a diversity of states of subdivision.

This catalytic material is in constant motion continuously gravitating from the upper vessel 1 to the lower vessel 2 through the tubular connecting leg 3. The flow of the catalytic material through the tubular leg 3 is controlled by a water cooled valve 5. The rate of flow is so regulated that the catalytic material attains a temperature of about 2200° to 2500° F. in the bottom section of the upper vessel 1 and then enters the lower vessel at a temperature of about 2000° to 2200° F. and therein falls to a temperature of about 1500° F. at the point of entry of the reactants from the exothermic zone, namely carbon dioxide and steam, whose mode of entry will be described in more detail later.

After the catalytic material has been further cooled in a manner which will be described later, it leaves the lower vessel through an exit conduit 6 which connects with an elevator system 7 whereby the catalytic material is continuously returned to the top portion of the upper vessel 1. The flow of the catalytic material is further regulated by a water cooled valve 8 on the exit conduit 6. The elevator system 7 may be of a mechanical variety or it may be of the pneumatic type. In the latter instance, the apparatus will be so designed that the methane, or a portion thereof, to be burned in the exothermic zone would be used under pressure to lift the catalytic material to the upper vessel. The constant movement of the catalytic material, whereby a cool portion of the same is continuously introduced into the upper portion of the exothermic vessel 1, precludes the attainment of excessive temperatures in the exothermic zone.

The stream of natural gas hydrocarbons is obtained from a source not shown through a pipe 10. This feed hydrocarbon gas may comprise hydrocarbons having from one to four carbon atoms per molecule, but is ordinarily mainly methane and is advantageously sulfur-free.

This feed stream is split into minor and major streams; the former consisting from about 25 to 40% of the feed while the latter comprises from 60 to 75% of the feed. The minor stream passes through a branch pipe 11 and the major stream traverses a branch pipe 12. The flow of the major stream will be described in detail later and for the present the minor stream will be followed.

The minor stream flows along the pipe 11 until it intersects a pipe 13 through which oxygen or an oxygen-rich gas, obtained from a source not shown, is flowing. The amount of oxygen flowing through the pipe 13 is regulated so that it will effect substantially total combustion of the minor hydrocarbon stream in the exothermic zone. The minor stream of the feed hydrocarbon, together with the oxygen-rich gas, is introduced into the lower portion of the upper vessel through the pipe 13. Provision may be made for premixing the hydrocarbon feed with the oxygen-rich gas before introduction into the upper vessel.

In the upper vessel 1, the hydrocarbon gas consisting mainly of methane is substantially totally oxidized by the oxygen-rich gas to form carbon dioxide and steam. This reaction is highly exothermic and the catalyst-bearing heat carrier contained therein, i. e., in the upper vessel 1, attains a temperature in the range of 2,000° to 2,500° F.

The carbon dioxide and steam formed in the exothermic oxidation issue from the upper vessel through a pipe 15 and through it proceed directly to the lower vessel 2 into which it is introduced with a portion of the major stream.

The major stream of feed hydrocarbons traverses pipe 12 until it is divided into a greater and smaller stream, the former traveling along pipe 16 while the latter flows through pipe 17. The smaller stream passes through the pipe 17 to a pump 18 wherein it is compressed prior to its use for injecting the hot carbon dioxide and steam into the lower vessel 2 through a pipe 19 by means of a jet mechanism 20. The jet mechanism 20 affords a simple means of obtaining the necessary higher pressure in the lower vessel.

The greater portion of the major stream of hydrocarbon feed passes through the pipe 16 to a blower or compressor 21 wherein it is compressed so that it will enter the lower vessel 2 through a pipe 22 at a pressure equal to or slightly in excess of the pressure at which the carbon dioxide and steam, together with the smaller portion of the major stream of hydrocarbon feed, are injected into the lower vessel 2. This greater portion of the hydrocarbon feed, at a temperature in the range of atmospheric to about 500° F., enters the vessel 2 at or near its nadir and considerably below the point of entry of the carbon dioxide-steam mixture in order to cool the catalyst-bearing heat carrier to a temperature at which it can be handled in the elevator 7 for return to the upper vessel 1. The conditions of operation are such that the catalyst advantageously falls to a temperature of about 1,500° F. (below which it is ineffective for supplying heat energy to the endothermic reaction) in the vicinity of the point of entry of the hot carbon dioxide and steam. With this arrangement the catalyst can be cooled by the incoming stream of hydrocarbon gas to a temperature in the range of about 900 to 1,200° F.

In the lower vessel 2, the major stream hydrocarbons react with carbon dioxide and steam produced by the exothermic oxidation and also with carbon dioxide recycled from the synthesis reaction to produce carbon monoxide and hydrogen. Heat energy for this endothermic reaction is supplied by heat exchange with a catalyst-bearing heat carrier which also promotes the reactions.

The effluent stream of carbon monoxide and hydrogen synthesis gas issues from the lower vessel 2 through an exit pipe 26 and flows through it to a cooler 27 in which the gases are cooled. From there the synthesis gas proceeds to a separator 29 through a pipe 28 wherein any water which has been carried along with the stream of synthesis gas is separated and removed through an exit pipe 30.

The synthesis gas then flows along a pipe 31 to a heater 32 wherein it reaches a temperature effective for the synthesis reaction, i. e., from about 300° to 600° F. depending upon what catalyst is to be employed.

The synthesis gas at the desired temperature flows through a pipe 33 to a synthesis converter 34 wherein it is subjected to contact with a synthesis catalyst which may comprise about 30 per cent iron, 60 per cent diatomaceous earth, or other supporting material, and about 10 per cent promoting substances such as the oxides of thorium or magnesium. It will be understood, of course, that instead of iron, other carbon monoxide-hydrogen synthesis catalysts such as cobalt and nickel, may be employed in the reaction.

As a result of contact with the synthesis catalyst, carbon monoxide and hydrogen react principally to form hydrocarbons or oxygenated hydrocarbons which are normally liquid. Some gaseous compounds such as methane are also formed and a considerable portion of carbon monoxide is converted to carbon dioxide, particularly when an iron type catalyst is employed. Water is also included among the products of reaction.

The products of the synthesis reaction pass along a pipe 35 to a separator 36 wherein the gaseous hydrocarbons, carbon dioxide and unreacted carbon monoxide and hydrogen are continuously removed from the normally liquid constituents. Herein the synthesis products are cooled so as to effect condensation of the normally liquid products and steam.

Assuming that the process is operated to produce hydrocarbons in the gasoline range, the liquid hydrocarbons and water accumulating in the separator 36 are drawn off through a pipe 37 to a liquid separator 38 wherein the liquid hydrocarbons are separated from the water. The water is removed through a pipe 39 while the liquid hydrocarbons are conducted to storage, not shown, through a pipe 40. These liquid hydrocarbons comprise naphtha and other higher boiling hydrocarbons.

The gaseous fraction separated in the separator 36 is removed through a pipe 45. Provision is made for discharging all or a portion of this gaseous fraction through a vent 46. It is preferred to conduct this gaseous fraction along the pipe 45 to a hydrocarbon absorption unit 47 which may be of a conventional type adapted to effect removal of light hydrocarbons such as propane, butane, etc., from the residual or tail gas. These light hydrocarbons may be discharged through an exit pipe 48 after they have been stripped from the absorbing medium.

The residual gas traverses a pipe 49 to a carbon dioxide stripping unit 50. Herein the carbon dioxide is absorbed in a suitable liquid such as triethanolamine solution. Upon regeneration of the absorbent medium, the carbon dioxide is liberated and is removed from the absorbing unit 50 through a pipe 55 and that portion, which is not vented through the vent 56, proceeds along the pipe 55 to the entry line 13 through which it is introduced into the upper vessel 1, together with the minor hydrocarbon stream and the oxygen-rich gas.

In the exothermic zone, this recycle carbon dioxide, which may be at substantially atmospheric temperatures, serves as a quenching agent and a temperature control for the highly exothermic combustion which takes place therein. The carbon dioxide plays this role since it does not enter into an exothermic reaction with the oxygen employed in the upper vessel, but rather reacts endothermically with the hydrocarbons.

The stripped tail gas leaves the carbon dioxide removal unit 50 through a pipe 60. This gas may be discharged from the system through a vent 61 and used thereafter as a fuel for firing any furnaces which are used to preheat the reactant gas streams. By venting a portion of the stripped tail gas in this fashion, the nitrogen concentration of the synthesis gas flowing into the synthesis converter 34 may be kept within a predetermined limit.

The portion of the stripped tail gas which is not vented may be returned directly to the synthesis converter through a pipe 62 and the pipe 33 since it comprises mainly unreacted carbon monoxide and hydrogen. Alternatively, it may be conducted to the endothermic zone, wherein its content of light hydrocarbon gases may be utilized. In this event, the stripped tail gas flows along a pipe 63 which intersects the pipe 12 through which flows the major hydrocarbon stream. Together with the major hydrocarbons, it is introduced into a lower vessel 2 in the manner which has been described in detail previously.

It is advantageous to regulate the proportions and compositions of the several reactant streams passing into the exothermic vessel 1 and into the endothermic vessel 11 so that the synthesis gas flowing through the pipe 33 to the synthesis converter 34 will consist essentially of carbon monoxide and hydrogen in predetermined proportions; for example, in the proportion of about 1 molecule of carbon monoxide to 1 molecule of hydrogen, if an iron catalyst is employed to convert the synthesis gas into a mixture of normally liquid hydrocarbons in the gasoline range.

Advantageously also, the feed hydrocarbon streams, both major and minor, and the oxygen-rich gas may pass through conventional heat exchange apparatus with the hot effluent gases from the endothermic zone or through furnaces—not shown in the drawing—which are fired by the vented tail gas referred to previously. By such means each stream may be brought to the temperature level desired prior to further treatment.

Provision may also be made to remove the excess carbon dioxide present in the synthesis gas which issues from the endothermic zone by inserting a carbon dioxide stripping unit in the line 31 between the separator 29 and the heater 32.

It is contemplated that the catalyst-bearing heat carrier may be used in a state of subdivision varying all the way from a finely divided powder to pellets $\frac{1}{4}$ to $\frac{1}{16}$ of an inch in diameter. If a finely divided powdered catalytic material is used, it will be necessary to install conventional dust collectors, such as cyclone separators, to remove the entrained powder from the synthesis gas before it reaches the synthesis converter 34. If catalyst-impregnated pebbles serve as the heat carrier, these dust collectors may be dispensed with as the attrition in such a process is negligible.

The invention is applicable to the production of oxygenated hydrocarbons and solid paraffin waxes, as well as to the production of normally liquid hydrocarbons. The oxygenated hydrocarbons may comprise compounds having a single carbon atom per molecule such as methanol, formaldehyde and formic acid.

An oxygen-rich gas containing less than 50 per cent oxygen stipulated previously may be used to effect oxidation of the hydrocarbon gases in the exothermic zone. If such is used, it will be necessary to cool the effluent gases from the exothermic zone and strip therefrom the inert gas before the product gases can be used in the endothermic reaction. A disadvantage of this procedure is that the heat content of the effluent gases is lost to the endothermic reaction necessitating a preheating of the carbon dioxide and steam before entry into the endothermic zone. However, such a modification as outlined is included within the concept of the invention.

Other heat carriers than the one mentioned previously, namely alumina, may be employed, such as silica gel. In similar fashion, a catalyst other than nickel, such as iron, may be used to catalyze the endothermic reaction. The carrier substance may be impregnated with the catalytic agents which latter amount to form a fraction of a per cent to about 5 per cent by weight of the carrier. The composite may be made by methods of co-precipitation.

It is contemplated that the gaseous feed hydrocarbon entering the exothermic zone may be mixed therein with oxygen in stoichiometrical proportions so as to effect substantially complete combustion of the hydrocarbons into carbon dioxide and steam. While mention is made of introducing carbon dioxide from the synthesis reaction into the exothermic zone, it may be recycled to the endothermic zone, or may be divided in any portion between the two zones.

Obviously many modifications and variations of the invention, as hereinbefore set forth, may be made without departing from the spirit and scope thereof and, therefore, only such limitations should be imposed as are indicated in the appended claims.

I claim:

1. In the preparation of synthesis gas containing CO and $H_2$ by conversion of normally gaseous hydrocarbons, the method comprising maintaining separate exothermic and endothermic reaction zones, maintaining a particle mass of solid catalyst-bearing heat carrier continuously moving through both said zones in succession, said catalyst being effective for converting gaseous hydrocarbons into CO and $H_2$, continuously introducing a stream of said gaseous hydrocarbons to said exothermic zone, continuously introducing thereto a gas rich in free oxygen, effecting substantially complete combustion of hydrocarbons and free oxygen in said exothermic zone and in proportions effective to produce a high temperature combustion gas consisting essentially of $CO_2$ and $H_2O$ in the presence of said catalyst whereby said catalyst is raised to an elevated temperature in excess of about 2000° F. prior to passing from the exothermic zone to the endothermic zone, discharging combustion gas from the exothermic zone at said elevated temperature, passing a stream of said discharged gas while substantially at said elevated temperature, directly into said endothermic zone, continuously introducing a separate stream of feed hydrocarbons to said endothermic zone, effecting substantial reaction of said separate stream hydrocarbons with $CO_2$ and $H_2O$ constituents of said combustion gas in the presence of heated catalyst moving through said endothermic zone at a temperature above about 1650° F. thereby producing synthesis gas consisting essentially of CO and $H_2$, discharging resulting synthesis gas from the endothermic zone, continuously removing catalyst from the endothermic zone, and recycling removed catalyst to said exothermic zone.

2. The method according to claim 1 wherein the gas rich in free oxygen consists of at least 50% oxygen.

3. The method according to claim 1 wherein hot catalyst from the endothermic reaction is cooled by heat exchange with a stream of hydrocarbon feed to the endothermic zone prior to recycling the catalyst to the exothermic zone.

4. The method according to claim 1 wherein the feed gaseous hydrocarbon to both the exothermic and endothermic zones is essentially methane.

5. In the preparation of synthesis gas containing carbon monoxide and hydrogen by conversion of normally gaseous hydrocarbons, the method comprising maintaining separate exothermic and endothermic reaction zones in vertical relation with the former above over the latter, maintaining a particle mass of solid catalyst-bearing heat-carrier continuously moving through both said zones in succession under the impetus of gravitational force, said catalyst being effective for converting gaseous hydrocarbons into carbon monoxide and hydrogen, continuously introducing a stream of said gaseous hydrocarbons to the upper exothermic zone, continuously introducing thereto a gas rich in free oxygen, effecting substantially complete combustion of hydrocarbons and said free oxygen in said exothermic zone and in proportions effective to produce a high temperature combustion gas consisting essentially of carbon dioxide and steam in the presence of said catalyst-bearing heat carrier whereby said catalyst is raised to an elevated temperature in excess of about 2000° F. prior to descending from the exothermic zone to the endothermic zone, discharging combustion gas from the exothermic zone at said elevated temperature, passing a stream of said discharged gas, while substantially at said elevated temperature, directly into said endothermic zone, continuously introducing a separate stream of feed hydrocarbons to said endothermic zone, effecting substantial reaction of said separate stream hydrocarbons with $CO_2$ and $H_2O$ constituents of said combustion gas in the presence of heated catalyst moving through said endothermic zone, at a temperature above about 1650° F., thereby producing synthesis gas consisting essentially of CO and $H_2$, discharging resulting synthesis gas from the endothermic zone, continuously removing catalyst from the endothermic zone, and recycling removed catalyst to said exothermic zone.

6. The method according to claim 5 wherein the solid catalyst-bearing heat carrier is raised to an elevated temperature of about 2,000° to 2,500° F. in the exothermic zone and a temperature of about 1,500° to 2,000° F. is maintained in the endothermic zone by movement therethrough of said solid catalyst-bearing heat carrier.

7. In the preparation of synthesis gas containing carbon monoxide and hydrogen by conversion of normally gaseous hydrocarbons, the method of comprising maintaining separate exothermic and endothermic reaction zones, maintaining a particle mass of solid heat carrier continuously moving through both said zones in succession, continuously introducing a stream of said gaseous hydrocarbons to said exothermic zone, continuously charging free oxygen thereto, effecting substantially complete combustion of said hydrocarbon and said free oxygen in said exothermic zone and in proportions such that the product is a high temperature combustion gas consisting essentially of carbon dioxide and water thereby heating said heat carrier to an elevated temperature in excess of about 2000° F., withdrawing said high temperature combustion gas from said exothermic zone, passing said heat carrier in heated condition into said endothermic zone, passing a stream of said combustion gas while substantially at said elevated temperature, directly into said endothermic zone, continuously charging a separate stream of feed hydrocarbons to said endothermic zone, effecting substantial reaction of said separate stream hydrocarbons with carbon dioxide and water of said combustion gas in the presence of said solid heat carrier moving through said endothermic zone at a temperature above about 1650° F. thereby producing synthesis gas containing carbon monoxide and hydrogen, discharging resulting synthesis gas, continuously removing said solid heat carrier from said endothermic zone, and recycling said carrier to said exothermic zone.

8. In the preparation of synthesis gas containing carbon monoxide and hydrogen wherein a gaseous hydrocarbon is endothermically reacted with carbon dioxide and water at an elevated temperature effective to result in a synthesis gas composed essentially of carbon monoxide and hydrogen in predetermined proportions, the improvement which comprises preparing a feed mixture of carbon dioxide and water at a combustion temperature in excess of about 2000° F., by continuously subjecting a hydrocarbon gas to complete combustion with free oxygen of high purity in an exothermic zone and in proportion such that substantially complete combustion of both the hydrocarbon and the free oxygen occurs to yield a combustion gas consisting essentially of carbon dioxide and water, effecting said combustion in the presence of a stream of solid, catalyst-bearing, heat carrier material effective for converting gaseous hydrocarbons into carbon monoxide and hydrogen under conditions such that the heat carrier solid is heated thereby to an elevated temperature in excess of about 2000° F., discharging said heat carrier material at said elevated temperature into an endothermic zone, withdrawing the high temperature combustion gas from said exothermic zone, passing said withdrawn combustion gas directly to said endothermic zone while substantially at combustion temperature, injecting a regulated, additional portion of gaseous hydrocarbon into the gas stream within said endothermic zone such that the temperature is above about 1650° F., passing said gases continuously in contact with said catalyst-bearing, heat carrier material at said temperature, effecting thereby substantial conversion of said gaseous hydrocarbon and said high temperature carbon dioxide into hydrogen and carbon monoxide, and withdrawing the product gases in relatively pure form.

DU BOIS EASTMAN.

REFERENCES CITED

The following references are of record in the file of this patent:

UNITED STATES PATENTS

| Number | Name | Date |
|---|---|---|
| 2,119,565 | Williams | June 7, 1938 |
| 2,355,753 | Roberts, Jr. | Aug. 15, 1944 |
| 2,381,696 | Shapleigh | Aug. 7, 1945 |
| 2,398,954 | Odell | Apr. 23, 1946 |
| 2,414,883 | Martin | Jan. 28, 1947 |
| 2,425,754 | Murphree et al. | Aug. 19, 1947 |
| 2,440,475 | Jacomini | Apr. 27, 1948 |
| 2,448,290 | Atwell | Aug. 31, 1948 |